H. C. H. LERCH.
FLIER SPINNING AND TWISTING MACHINE.
APPLICATION FILED OCT. 23, 1914.
1,148,102.
Patented July 27, 1915.
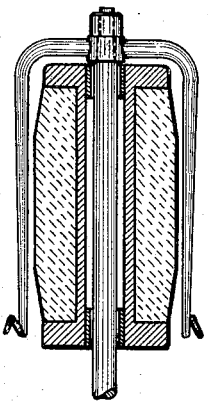
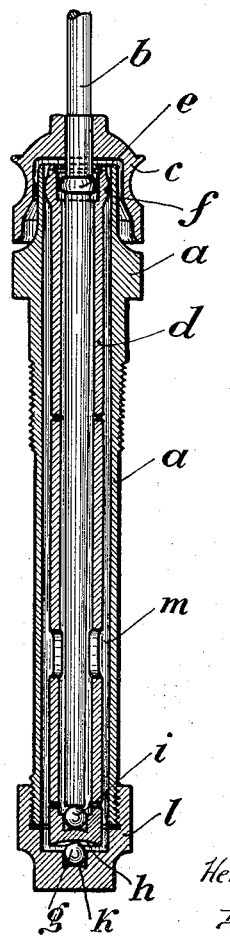
Witnesses:
Inventor,
Hermann Carl Heinrich Lerch,
By Glenn S. Noble
Att'y.

UNITED STATES PATENT OFFICE.

HERMANN CARL HEINRICH LERCH, OF AMERIKA-ON-THE-MULDE, GERMANY.

FLIER SPINNING AND TWISTING MACHINE.

1,148,102. Specification of Letters Patent. Patented July 27, 1915.

Original application filed July 14, 1913, Serial No. 778,840. Divided and this application filed October 23, 1914. Serial No. 868,346.

*To all whom it may concern:*

Be it known that I, HERMANN CARL HEINRICH LERCH, a citizen of the German Empire, residing at Amerika-on-the-Mulde, in the Kingdom of Saxony, Germany, have invented certain new and useful Improvements in Flier Spinning and Twisting Machines, of which the following is a specification.

My invention relates to improvements in flier spinning and twisting machines, and more particularly to the construction of the bearings of the flier spindles of such machines.

This application is a division of my former application filed July 14, 1913, Serial No. 778840.

I have found that the bearings for the spindles on machines heretofore used have had various objectionable features, and the present invention is intended to overcome such objections as fully as possible.

The present invention has for its object to provide an improved flier spindle bearing of the most simple construction, and which will work in an absolutely and permanently reliable manner at all speeds.

The invention consists substantially in providing a double bearing casing of known construction in which the inner sleeve that receives the spindle and that is made spherical in the usual manner in the plane of engagement of the driving cord, is caused to bear in a movable manner with its hollow spherical base likewise upon a sphere arranged in the outer bearing casing.

The invention is illustrated by way of example in the accompanying drawing, in which $a$ is the fixed bearing sleeve adapted to be screwed into the spindle rail, $b$ the spindle composed in the usual manner of a steel body carrying on its unsupported cylindrical upper part in addition to the driving whirl $c$ the flier and the bobbin.

The middle portion of the spindle $b$ is provided with a rounded collar $e$ working in an enlarged part $f$ of the bore of the inner sleeve $d$. The ball $i$ forms the footstep bearing for the spindle $b$. The inner sleeve $d$ is bulged at its bottom which serves as a bearing for the ball $i$. The hollow spherical foot of the inner sleeve $d$ bears upon a ball $g$ which in its turn bears upon a convex surface $k$ of the bottom cap $l$ of the outer sleeve $a$. In my improved bearing the spindle is therefore no longer mounted directly in the fixed bearing sleeve $a$, but is mounted indirectly in a sleeve $d$ which in its turn, owing to its bearing upon a ball, allows the spindle to rock freely even when the outer sleeve $a$ should not be in an exactly vertical position or be screwed askew in to the spindle rail.

While in describing the invention reference has been made to a particular embodiment thereof, I wish it to be understood that my invention is not limited to the example shown in the drawing, and that various changes may be made in the construction. The invention may also be applied to ring spindles.

I claim as my invention:

1. A bearing for flier spindles, comprising an outer casing an inner sleeve in said casing for receiving the spindle, said inner sleeve having a spherical bearing at its upper end in the plane of engagement of the driving cord, for engagement with the outer casing, and also having a hollow spherical base, a ball arranged in the outer casing upon which said base bears in a freely movable manner, for the purpose of effecting an automatic centering tendency at all speeds.

2. A bearing for flier spindles, comprising an outer casing, an inner sleeve in said casing for receiving the spindle, said inner sleeve having a bearing at its upper end and having a spherical concaved base, and a ball arranged in the outer casing, and serving as a bearing for said base.

HERMANN CARL HEINRICH LERCH.

Witnesses:
F. E. STEGEL,
W. H. MUCKE.